United States Patent [19]
Welch

[11] Patent Number: 5,381,994
[45] Date of Patent: Jan. 17, 1995

[54] UNIVERSAL BASE

[76] Inventor: Richard Welch, 909 Ludwig Rd., Fort Wayne, Ind. 46825

[21] Appl. No.: 91,318

[22] Filed: Jul. 14, 1993

[51] Int. Cl.⁶ .................................................. A47B 91/00
[52] U.S. Cl. ................................... 248/346; 52/220.7; 160/135; 174/48
[58] Field of Search ............... 248/346; 52/220.7, 242; 174/48, 49, 95; 439/215; 160/135, 127

[56] References Cited

U.S. PATENT DOCUMENTS

| | | |
|---|---|---|
| 1,718,252 | 6/1929 | Putnam. |
| 1,718,253 | 6/1929 | Putnam. |
| 2,000,243 | 5/1935 | Manske. |
| 2,808,136 | 10/1957 | Hammitt et al.. |
| 3,464,052 | 8/1969 | Hukin. |
| 4,135,775 | 1/1979 | Driscoll. |
| 4,203,639 | 5/1980 | VandenHoek et al.. |
| 4,231,630 | 11/1980 | Propst .................. 174/48 X |
| 4,257,203 | 3/1981 | Propst .................. 52/220.7 |
| 4,277,123 | 7/1981 | Haworth et al.. |
| 4,278,834 | 7/1981 | Boundy. |
| 4,406,101 | 9/1983 | Heidmann .............. 52/220.7 |
| 4,462,650 | 7/1984 | Humphreys. |
| 4,631,881 | 12/1986 | Charman ............... 174/48 X |
| 4,720,953 | 1/1988 | Onishi et al.. |
| 4,800,695 | 1/1989 | Menchetti. |
| 4,905,428 | 3/1990 | Sykes ................... 160/135 X |
| 5,062,246 | 11/1991 | Sykes ................... 52/220.7 X |
| 5,065,556 | 11/1991 | Delong ................. 160/135 X |
| 5,092,787 | 5/1992 | Wise et al.. |
| 5,152,698 | 10/1992 | Juhlin et al.. |
| 5,175,969 | 1/1993 | Knauf ................... 160/135 X |
| 5,214,889 | 6/1993 | Nienhuis ............... 439/215 X |
| 5,274,970 | 1/1994 | Roberts ................ 160/135 X |
| 5,277,006 | 1/1994 | Ruster ................... 174/48 X |

Primary Examiner—J. Franklin Foss
Attorney, Agent, or Firm—Barnes & Thornburg

[57] ABSTRACT

A universal base for modular wall panels of various thicknesses includes two spaced-apart members with a bracket rotatably disposed therebetween. The members are coupled to a pair of legs which support a threaded member for supporting a wall panel thereon. A wiring harness may be mounted to the rotatable brackets from either side of the wall panel. The vertical location of the support for the wall panel and the spaced-apart members and bracket may be varied independently of each other. Accordingly, the vertical location of the wall panel and the vertical location of the wiring harness may be varied independently of each other. The spaced-apart members further include an arrangement for attaching a cover plate thereto. The top portion of the cover plate is flexible and inwardly biased so as to accommodate wall panels of varying thicknesses.

39 Claims, 3 Drawing Sheets

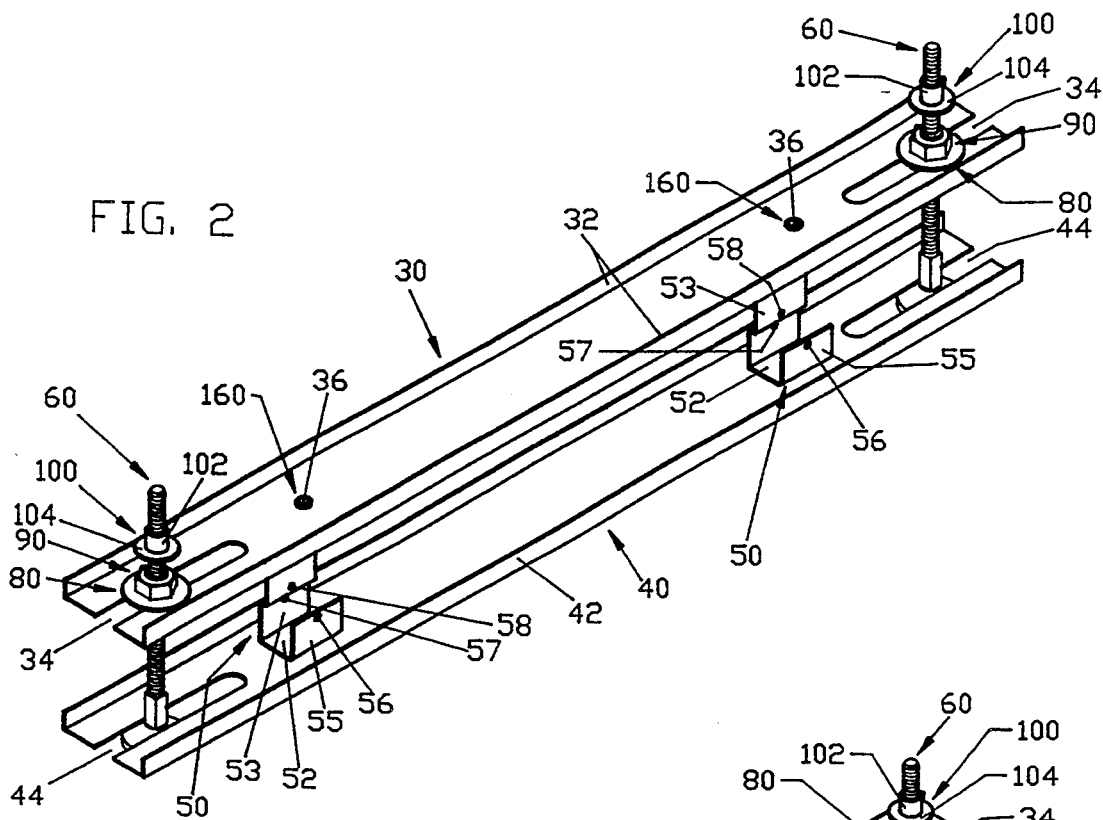

UNIVERSAL BASE

BACKGROUND AND SUMMARY OF THE INVENTION

The present invention relates to modular wall panels and more particularly to an improved method for supporting a modular wall panel and equipping it with a wiring harness.

Modern offices often use free standing partitions or wall panels to form individual office cubicles in the open office environment. These cubicles provide a proper working environment while maintaining versatility and mobility for unrestricted office organization and expansion. As a matter of course, a modular wall panel may be provided with a base sufficient to support it. Various wall panel bases are possible. For example, legs or similar support members may be permanently attached to the lower edge surface of the wall panel. Similarly, the panel may rest against the floor surface and be attached thereto by use of brackets or similar devices. Whatever the method of supporting the panel, it may be desirable to have a base that is reusable and may be utilized with wall panels of different thicknesses. Such a base could be removed from a damaged wall panel and utilized in conjunction with a different panel. Similarly, one base could be provided to a customer who could then use that base in conjunction with various size wall panels.

In addition to providing proper support for the panel, it may be desirable to provide a base that can accommodate telephone wires, computer cables, electrical receptacles and similar components utilized to provide power to various office equipment. Such power is usually provided by means of a wiring harness, which electrically couples adjacent wall panels. Because a large office may utilize a great many modular wall panels, it is further desirable to utilize a wall panel base that provides flexibility in mounting wiring harnesses. More particularly, it is desirable that the base provide a mechanism for allowing the wiring harness to be mounted from either side of the panel, thus allowing greater ease of installation.

Additionally, to provide greater flexibility in setting up the office environment, it may be further desired that the height of the wall panel and the vertical position of the wiring harness be adjustable. Such features would allow for more precise alignment of adjacent panels and wiring harnesses.

Accordingly, it is an object of the present invention to provide an improved base for supporting a modular wall panel.

Another object of the present invention is to provide a modular wall panel base that may be removed from one wall panel and utilized with another.

Still another object of the present invention is to provide a wall panel base that may be utilized with panels of various thicknesses.

Yet another object of the present invention is to provide a base for a wall panel that permits a wiring harness to be mounted from either side of the wall panel.

A further object of the present invention is to provide a wall panel base that allows the height of the panel to be adjusted independently of the location of the wiring harness and allows the vertical location of the wiring harness to be adjusted independently of the height of the panel.

These and other objects of the present invention are attained by the provision of a base for a modular wall panel including legs contacting the surface on which the panel is to be supported and support means for supporting the panel on the legs. The base further includes mounting means coupled to the legs for mounting a wiring harness to the base. A portion of the mounting means is rotatable so as to allow mounting of the wiring harness from either side of the panel.

In one embodiment of the invention, the support means for supporting the panel is vertically adjustable independently of the mounting means. The location of the wiring harness may also be varied independently of the location of the wall panel by varying the location of the mounting means.

In another embodiment, the support means for supporting the panel comprises a generally cylindrical member with a ledge disposed thereon. The cylindrical member and ledge include a bore for receiving the legs. The legs and cylindrical member engage a blind nut embedded in the bottom of the wall panel. The lower edge of the panel is supported by the legs, cylindrical member and ledge.

In one embodiment of the invention, the mounting means comprises two vertically spaced-apart members with rotatable brackets disposed between them. The wiring harness is attached to the rotatable brackets. The mounting means and wiring harness are coupled to the legs by inserting the legs in slots cut into the ends of the spaced-apart members and clamping one of the members between a retainer nut and a thrust nut threaded onto each of the legs.

In another embodiment, cover plates are attached to the vertically spaced-apart members to shield the members, brackets, legs, and wiring harness from view. The cover plates have holes cut therein to provide access to the receptacle assemblies mounted on the wiring harness. The cover plates further include a flexible inwardly biased top portion which contacts the surface of the wall panel. Because the top portion is flexible and inwardly biased, the cover plates, and hence the base, can accommodate wall panels of varying thicknesses.

Other objects, advantages, and novel features of the present invention will become apparent from the following detailed description of the preferred embodiments when considered in conjunction with the accompanying drawings.

BRIEF DESCRIPTION OF THE DRAWINGS

FIG. 2 is a perspective view of the interior members of a universal base according to the present invention.

FIG. 3 is a perspective view of the interior members of a universal base according to the present invention with a wiring harness including a receptacle assembly attached thereto.

DETAILED DESCRIPTION OF THE INVENTION

Figure 1:
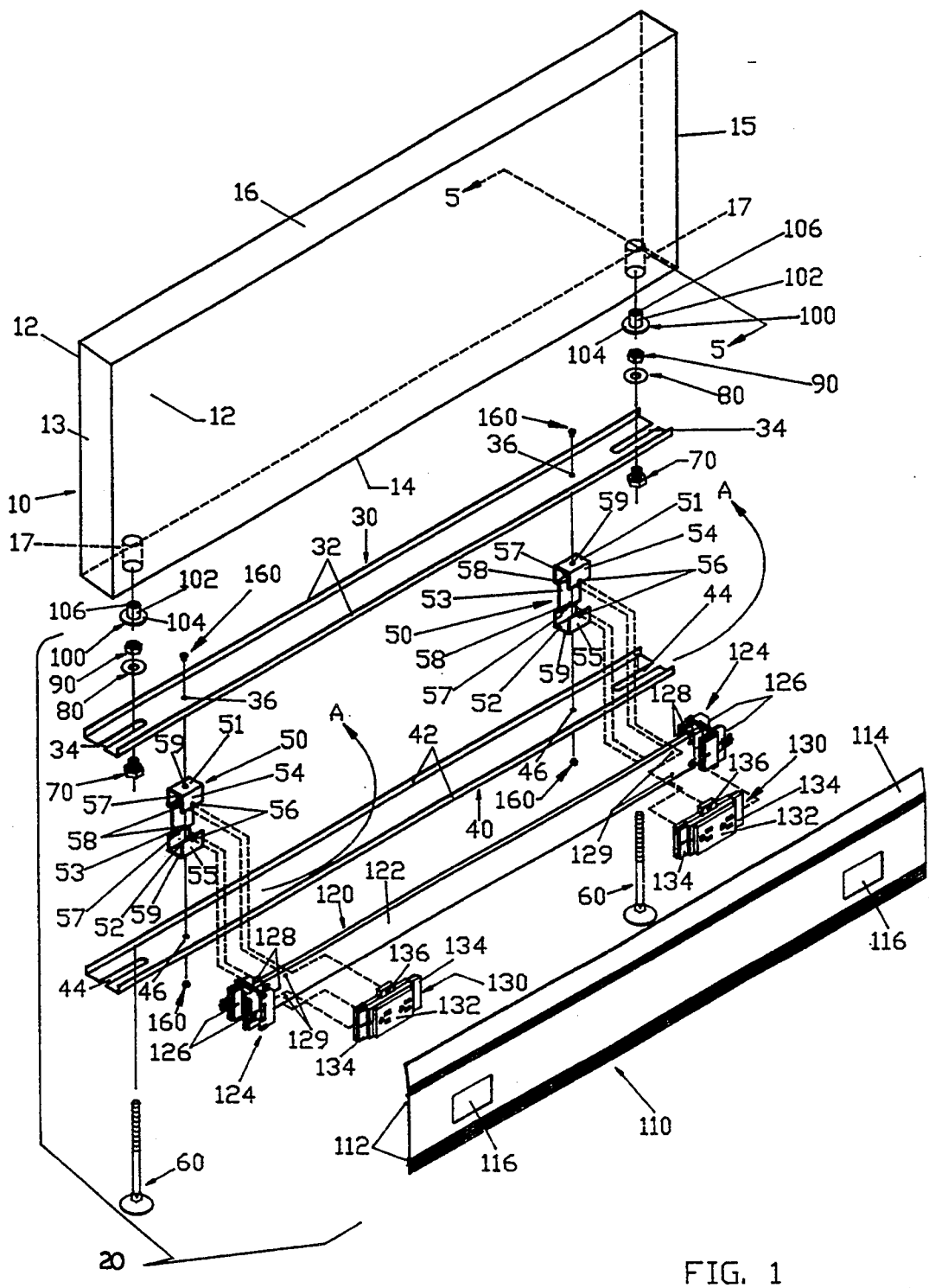
FIG. 1 is an exploded perspective view of a modular wall panel equipped with a universal base according to the present invention and further including a wiring harness and electrical receptacle assemblies.

FIG. 1 shows an exploded perspective view of an illustrative embodiment of a modular wall panel equipped with a universal base according to the present invention. The fully equipped wall panel assembly includes panel 10, universal base 20, wiring harness 120 and electrical receptacle assemblies 130. Wall panel 10 comprises two generally planar opposing sides 12 defined by edge surfaces 13, 14, 15, and 16. Lower edge surface 14 further includes two blind nuts 100, embedded and secured in bored holes 17. Universal base 20 includes top member 30, bottom member 40, brackets 50, threaded legs 60, thrust nuts 70, washers 80, retainer nuts 90, blind nuts 100, and cover plate 110. Wiring harness 120 comprises a generally flat channel 122 having end assemblies 124 including connecting ports 126 and receptacle ports 128. Channel 122 includes mounting holes 129 therein. Receptacle assemblies 130 include body portions 132, coupling portions 134, and mounting holes 136.

Top member 30 of universal base 20 includes upturned edges 32 running the length thereof. Each edge 32 supports a cover plate 110 as described below. Top member 30 also includes two slots 34 for receiving legs 60. Top member 30 further includes mounting holes 36 for attaching brackets 50 thereto. Similarly, bottom member 40 includes upturned edges 42, slots 44, and mounting holes 46.

Brackets 50 include top surface 51 and bottom surface 52 joined by bight 53. Edge 54 of top surface 51 is bent downward toward bottom surface 52, and edge 55 of bottom surface 52 is bent upward toward top surface 51. Top surface 51 and bottom surface 52 include mounting holes 59 which are used in conjunction with mounting holes 36 of top member 30 and mounting holes 46 of bottom member 40 to secure brackets 50 between top member 30 and bottom member 40 as described below. Bight 53 includes a first set of holes 58 for attaching wiring harness 120 thereto and a second set of holes 57 for securing a receptacle assembly 130 thereto. Edges 54 and 55 also include mounting holes 56 for attaching a receptacle assembly 130 thereto.

Each blind nut 100 comprises a generally cylindrical member 102 with a ledge 104 disposed thereon. Threaded bore 106 runs through cylindrical member 102 and ledge 104.

Cover plate 110 includes hooks 112 on the inside surface thereof, which assist in mounting cover plate 110 to the interior components of universal base 20 as described below. Cover plate 110 further includes an inwardly biased top portion 114 and openings 116 through which receptacle assemblies 130 extend when base 20 is fully assembled.

To assemble the interior components of universal base 20, brackets 50 are secured between top member 30 and bottom member 40 by inserting rivets or similar fasteners (not shown) through a pair of holes 36 and 59 and a pair of holes 46 and 59. Brackets 50 are secured between top member 30 and bottom member 40 so as to be rotatable about their vertical axes, as indicated by arrows A in FIG. 1. A thrust nut 70 is threaded onto each leg 60. Washer 80 is positioned over the outer threads of the thrust nut 70, and retainer nut 90 is threaded onto the outer threads of thrust nut 70. Each leg 60 is then positioned in a pair of slots 34 and 44 such that the foot of leg 60 is below bottom member 40 and top member 30 is between the support face of thrust nut 70 and washer 80. Retainer nut 90 is then tightened onto thrust nut 70 so as to clamp top member 30 between them. In this position, top member 30, bottom member 40 and brackets 50 are suspended on legs 60 as a single unit. FIG. 2 shows the assembled interior components of base 20.

Figure 4:
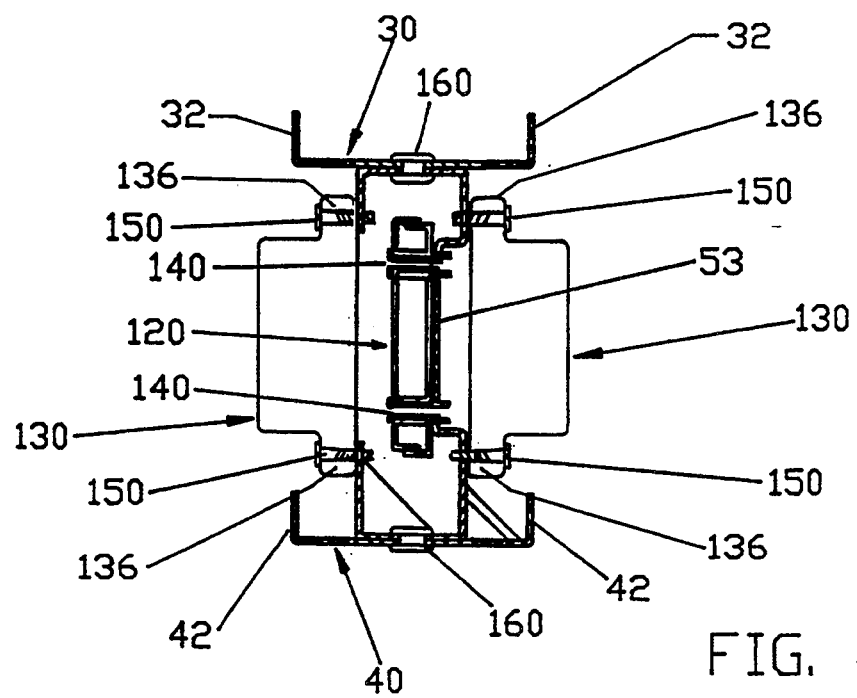
FIG. 4 is a cross-sectional view taken along line 4—4 in FIG. 3.

FIG. 3 shows the assembled interior components of base 20 with wiring harness 120 attached thereto. As can be seen, wiring harness 120 is attached to brackets 50 by means of screws, rivets or other fasteners 140 inserted through holes 129 in channel 122 and holes 58 in brackets 50. FIG. 3 also shows a receptacle assembly 130 attached to one end of base 20 by insertion in receptacle port 128 on wiring harness 120 and fastening with screws or other fasteners 150 to bracket 50. This attachment may be better seen in FIG. 4, which is a cross-sectional view taken along line 4—4 in FIG. 3. Rivets 160 used to attach brackets 50 to top member 30 and bottom member 40 can also be seen in FIG. 4.

As previously noted, brackets 50 are attached to top member 30 and bottom member 40 so as to be rotatable about their vertical axes. Accordingly, wiring harness 120 may be attached to brackets 50 from either side of wall panel 10 by simply rotating brackets 50 such that downturned edge 54 and upturned edge 55 face the side from which harness 120 is to be mounted. Furthermore, the vertical location of wiring harness 120 on legs 60 may be varied by changing the location of brackets 50. This is accomplished by changing the location of thrust nut 70 on legs 60. Because top member 30 is clamped between thrust nut 70 and retainer nut 90, the location of top member 30 changes with the location of thrust nut 70. Furthermore, because brackets 50 and bottom member 40 are tied to top member 30, the location of brackets 50 and bottom member 40 change with the location of top member 30. Accordingly, the vertical location of wiring harness 120 may be varied as desired.

Figure 5:
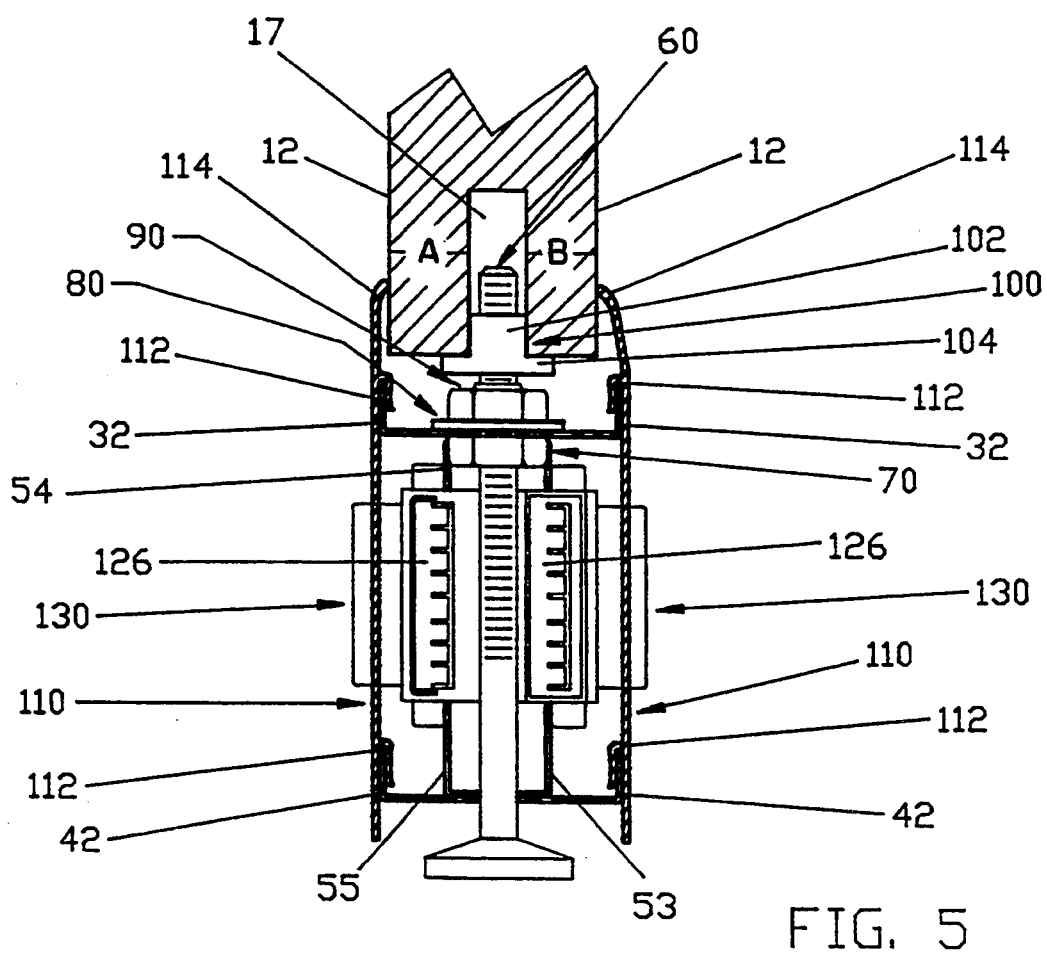
FIG. 5 is a cross-sectional view taken along line 5—5 in FIG. 1.

To support panel 10 on base 20, leg 60 is threaded into blind nut 100 which is embedded and secured in bored hole 17 in lower edge 14 of panel 10 (FIG. 5). The vertical location of panel 10 may be varied by threading leg 60 into or out of blind nut 100. As can be seen in FIG. 5, the location of panel 10 on leg 60 may be varied independently of the location of wiring harness 120. Similarly, the vertical location of wiring harness 120 may be varied along leg 60 independently of the location of wall panel 10. Also, the location of legs 60 may be varied to correspond to the location of bored holes 17 by positioning legs 60 as needed within slots 34 and 44.

FIG. 5 further shows how base 20 may be utilized with wall panels of varying thicknesses. After wiring harness 120 and receptacle assemblies 130 have been attached to brackets 50 as previously described, cover plates 110 are positioned such that receptacles 130 extend through holes 116 and hooks 112 engage edges 32 and 42 of top member 30 and bottom member 40, respectively. In this manner, wiring harness 120 and the interior components of base unit 20 are shielded from view. Also, top portion 114 of each cover plate 100 contacts a surface 12 of wall panel 10. Because top portion 114 is initially biased inward and is flexible, it will maintain contact with surface 12 regardless of the thickness of panel 10. For example, if the panel thickness is as indicated by dimension A (as shown on the right side of FIG. 5), top portion 114 of cover plate 110 will bend inward to contact surface 12. If, however, the panel thickness is as indicated by dimension B shown on the left side of FIG. 5), top portion 114 of cover plate 110 will flex outward to accommodate the thicker panel while still maintaining contact with surface 12. Accordingly, base unit 20 may be utilized with panels of varying thicknesses.

It is anticipated that bored hole 17 would normally be located on the center line of surface 14 of panel 10. FIG. 5 shows bored hole 17 dividing panel 10 into unequal sections merely for purposes of illustrating how base unit 20 accommodates wall panels of varying thicknesses. However, as FIG. 5 shows, bored hole 17 does not have to be positioned down the center of edge 14; cover plate 110 will adjust to contact a surface 12 even if bored hole 17 is off center.

Although the invention has been described and illustrated in detail, it is to be understood that the same is intended by way of illustration only and is not to be taken by way of limitation. The spirit and scope of the invention are be limited only by the claims appended hereto.

What is claimed is:

1. A base for supporting a modular wall panel, said base comprising:
   at least one leg contacting a surface on which said panel is to be supported;
   support means coupled to said leg for supporting said panel along an edge surface thereof; and
   mounting means, coupled to said leg for mounting a wiring harness to said base, wherein at least a portion of said mounting means is rotatable so as to allow said harness to be mounted to the base from either of two opposing sides.

2. The base according to claim 1, wherein said support means for supporting said panel is vertically adjustable independently of said mounting means.

3. The base according to claim 2, wherein said support means for supporting said panel comprises a generally cylindrical member including a bore therein for receiving the leg and a ledge disposed around said member on which said panel rests.

4. The base according to claim 1, wherein said mounting means comprises:
   a first member and a second member, wherein said members are vertically spaced apart to define a space for receiving said wiring harness; and
   at least one bracket disposed between said members rotatably coupled to at least one of said members, and wherein said bracket includes means for attaching said wiring harness thereto.

5. The base according to claim 4, wherein at least one of said members is adjustably coupled to the leg, and wherein said members and bracket are vertically adjustable independently of said support means.

6. The base according to claim 5, wherein said bracket includes a first surface coupled to said first member and a second surface coupled to said second member, a bight connecting said first and second surfaces, said bight including means for attaching said wiring harness thereto and means for securing a first receptacle assembly thereto, and said first and second surfaces having downturned and upturned edges respectively, said edges including means for securing a second receptacle assembly thereto.

7. The base according to claim 1, wherein said mounting means includes means for supporting at least one cover plate to conceal said wiring harness.

8. The base according to claim 7, wherein said support means, mounting means and cover plate are adapted to support a plurality of wall panels having respective wall thicknesses which vary between first and second predetermined thicknesses.

9. The base according to claim 8, wherein said cover plate has a top edge portion which is preformed to extend inwardly toward the panel, and which is flexible so as to maintain contact with a surface of the panel so long as the thickness of the panel is within said first and second predetermined thicknesses.

10. The base according to claim 1, including at least two legs, each disposed adjacent respective ends of the base, wherein the location of each leg may be varied within a predetermined distance of the ends of the base.

11. A base for supporting a modular wall panel, said base comprising:
    at least one leg contacting a surface on which said panel is to be supported;
    bracket means supported on said leg, said bracket means including means for attaching a wiring harness thereto; and
    means for supporting said panel on said leg such that said panel may be raised and lowered relative to said leg independently of said bracket means.

12. The base according to claim 11, wherein said bracket means can be raised and lowered relative to said leg independently of said panel.

13. The base according to claim 12, wherein said bracket means comprises:
    a first member and a second member, wherein said members are vertically spaced apart to define a space for receiving said wiring harness; and
    at least one bracket disposed between said members rotatably coupled to at least one of said members, and wherein said bracket includes means for attaching said wiring harness thereto.

14. The base according to claim 13, wherein said bracket includes a first surface coupled to said first member and a second surface coupled to said second member, a bight connecting said first and second surfaces, said bight including means for attaching said wiring harness thereto and means for securing a first receptacle assembly thereto, and said first and second surfaces having downturned and upturned edges respectively, said edges including means for securing a second receptacle assembly thereto.

15. The base according to claim 11, wherein said means for supporting said panel comprises a generally cylindrical member including a bore therein for receiving the leg and a ledge disposed around said member on which said panel rests.

16. The base according to claim 11, wherein said bracket means includes means for supporting at least one cover plate to conceal said wiring harness.

17. The base according to claim 16, wherein said support means, bracket means and cover plate are adapted to support a plurality of wall panels having respective wall thicknesses which vary between first and second predetermined thicknesses.

18. The base according to claim 17, wherein said cover plate has a top edge portion which is preformed to extend inwardly toward the panel, and which is flexible so as to maintain contact with a surface of the panel so long as the thickness of the panel is within said first and second predetermined thicknesses.

19. A base for a modular wall panel, comprising:
    at least one leg;
    means for supporting said panel relative to said leg;
    bracket means for supporting a wiring harness; and
    means for mounting said bracket means on said leg such that said bracket means may be raised and lowered relative to said leg independently of said panel.

20. The base according to claim 19, wherein said panel may be raised and lowered independently of said bracket means.

21. The base according to claim 20, wherein said means for supporting said panel relative to said leg comprises a generally cylindrical member including a bore therein for receiving the leg and a ledge disposed around said member on which said panel rests.

22. The base according to claim 19, wherein said bracket means comprises means for selectively attaching the wiring harness to the base from either of two longitudinally extending sides of the base.

23. The base according to claim 22, wherein said means for mounting said bracket means includes a first member and a second member, said members disposed substantially directly above each other a fixed distance apart thereby defining a space for receiving said wiring harness, and wherein said bracket means is rotatable about at least one axis and is disposed between said first and second members.

24. The base according to claim 23, wherein said bracket means includes a first surface coupled to said first member and a second surface coupled to said second member, a bight connecting said first and second surfaces, said bight including means for attaching said wiring harness thereto and means for securing a first receptacle assembly thereto, and said first and second surfaces having downturned and upturned edges respectively, said edges including means for securing a second receptacle assembly thereto.

25. The base according to claim 19, wherein said means for mounting said bracket means includes means for supporting at least one cover plate to conceal said wiring harness.

26. The base according to claim 25, wherein said means for supporting said panel, means for mounting said bracket means, bracket means and cover plate are adapted to support a plurality of wall panels having respective wall thicknesses which vary between first and second predetermined thicknesses.

27. The base according to claim 26, wherein said cover plate has a top edge portion which is preformed to extend inwardly toward the panel, and which is flexible so as to maintain contact with a surface of the panel so long as the thickness of the panel is within said first and second predetermined thicknesses.

28. A base for supporting a modular wall panel, said base comprising:
support means for supporting said panel so as to provide a space between an edge surface of said panel and the underlying surface on which said panel is supported;
mounting means for mounting a wiring harness to one of said panel and said support means in said space, said mounting means including means for varying the vertical location of said wiring harness in said space independently of the location of said panel; and
means for varying the distance between said edge surface and said underlying surface independently of said mounting means.

29. The base according to claim 28, wherein at least a portion of said mounting means is rotatable so as to allow said harness to be mounted to the base from either of two opposing sides.

30. The base according to claim 29, wherein said mounting means comprises:
a first member and a second member, wherein said members are vertically spaced apart to define a space for receiving said wiring harness; and
at least one bracket disposed between said members rotatably coupled to at least one of said members, and wherein said bracket includes means for attaching said wiring harness thereto.

31. The base according to claim 30, wherein said bracket includes a first surface coupled to said first member and a second surface coupled to said second member, a bight connecting said first and second surfaces, said bight including means for attaching said wiring harness thereto and means for securing a first receptacle assembly thereto, and said first and second surfaces having downturned and upturned edges respectively, said edges including means for securing a second receptacle assembly thereto.

32. The base according to claim 28, wherein said support means for supporting said panel comprises a generally cylindrical member including a bore therein for receiving the leg and a ledge disposed around said member on which said panel rests.

33. A modular wall panel, comprising:
a generally planar panel having first and second generally planar opposing sides defined by first, second, third and fourth edge surfaces;
a wiring harness;
a base for supporting said panel along one of said edge surfaces relative to an underlying, generally horizontal surface, said base comprising at least one leg contacting the underlying surface on which said panel is to be supported, support means for supporting said panel on said leg so as to provide a space between the opposing edge surface of said panel and said underlying surface, mounting means for mounting said wiring harness to one of said panel and said base in said space, said mounting means including means for mounting said harness from either side of said panel, and said support means including means for varying the distance between said edge surface of the panel and said underlying surface independently of said mounting means, and said mounting means including means for varying the vertical location of said mounting means within said base independently of said panel.

34. The wall panel according to claim 33, wherein said support means for supporting said panel comprises a generally cylindrical member including a bore therein for receiving the leg and a ledge disposed around said member on which said panel rests.

35. The wall panel according to claim 33, wherein said mounting means comprises:
a first member and a second member, wherein said members are vertically spaced apart to define a space for receiving said wiring harness; and
at least one bracket disposed between said members rotatably coupled to at least one of said members, and wherein said bracket includes means for attaching said wiring harness thereto.

36. The wall panel according to claim 35, wherein said bracket includes a first surface coupled to said first member and a second surface coupled to said second member, a bight connecting said first and second surfaces, said bight including means for attaching said wiring harness thereto and means for securing a first receptacle assembly thereto, and said first and second surfaces having downturned and upturned edges respectively, said edges including means for securing a second receptacle assembly thereto.

37. The wall panel according to claim 33, wherein said mounting means includes means for supporting at least one cover plate to conceal said wiring harness.

38. The wall panel according to claim 37, wherein said support means, mounting means and cover plate are adapted to support a plurality of wall panels having respective wall thicknesses which vary between first and second predetermined thicknesses.

39. The wall panel according to claim 38, wherein said cover plate has a top edge portion which is preformed to extend inwardly toward the panel, and which is flexible so as to maintain contact with a surface of the panel so long as the thickness of the panel is within said first and second predetermined thicknesses.

* * * * *